(12) United States Patent
Herman et al.

(10) Patent No.: US 10,816,137 B2
(45) Date of Patent: Oct. 27, 2020

(54) REMOTE WELL SERVICING SYSTEMS AND METHODS

(71) Applicant: GE OIL & GAS PRESSURE CONTROL LP, Houston, TX (US)

(72) Inventors: Christopher Taylor Herman, Houston, TX (US); Saurabh Kajaria, Houston, TX (US); Justin Kristopher Lin, Houston, TX (US); Timothy Fuller, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 527 days.

(21) Appl. No.: 15/424,669

(22) Filed: Feb. 3, 2017

(65) Prior Publication Data

US 2017/0146189 A1 May 25, 2017

Related U.S. Application Data

(63) Continuation-in-part of application No. 14/725,341, filed on May 29, 2015, now Pat. No. 10,260,327.

(60) Provisional application No. 62/291,616, filed on Feb. 5, 2016, provisional application No. 62/092,543, filed on Dec. 16, 2014, provisional application No. 62/006,681, filed on Jun. 2, 2014, provisional application No. 62/005,720, filed on May 30, 2014.

(51) Int. Cl.
| | |
|---|---|
| *F16N 25/00* | (2006.01) |
| *E21B 43/26* | (2006.01) |
| *F16N 13/22* | (2006.01) |
| *F16N 21/00* | (2006.01) |

(52) U.S. Cl.
CPC .............. *F16N 13/22* (2013.01); *E21B 43/26* (2013.01); *F16N 21/00* (2013.01); *F16N 25/00* (2013.01); *F16N 2270/70* (2013.01); *F16N 2280/02* (2013.01)

(58) Field of Classification Search
CPC ............................... E21B 43/017; E21B 34/04
See application file for complete search history.

(56) References Cited

U.S. PATENT DOCUMENTS

| | | | | |
|---|---|---|---|---|
| 3,552,903 A | * | 1/1971 | Townsend | E21B 33/035 166/356 |
| 3,643,736 A | * | 2/1972 | Talley, Jr. | E21B 43/017 166/356 |
| 3,777,812 A | * | 12/1973 | Burkhardt | E21B 41/04 166/338 |

(Continued)

*Primary Examiner* — Shane Bomar
(74) *Attorney, Agent, or Firm* — Hogan Lovells US LLP

(57) ABSTRACT

Embodiments of the present disclosure include a remote well servicing system including a control unit and a remote servicing manifold. The control unit further includes a service fluid source and a control system. The remote servicing manifold further includes a fluid input line coupled to the service fluid source, a fluid output line couplable to a well component, and a valve coupled to the fluid input line and the fluid output line, wherein the valve, when actuated, places the fluid input line in fluid communication with the fluid output line and permits delivery of a service fluid from the service fluid source to the well component. The remote servicing manifold also includes a control line coupling the valve and the control system wherein the control system controls actuation of the valve via the control line.

18 Claims, 7 Drawing Sheets

(56) References Cited

U.S. PATENT DOCUMENTS

| | | | | |
|---|---|---|---|---|
| 4,848,474 A * | 7/1989 | Parizot | | E21B 43/017 |
| | | | | 166/366 |
| 8,220,553 B2 | 7/2012 | Crawford | | |
| 9,315,372 B2 | 4/2016 | Doi et al. | | |
| 2009/0266554 A1* | 10/2009 | Wilson | | E21B 43/122 |
| | | | | 166/372 |
| 2010/0032031 A1* | 2/2010 | Neal | | E21B 21/02 |
| | | | | 137/565.01 |
| 2011/0030963 A1* | 2/2011 | Demong | | E21B 43/26 |
| | | | | 166/313 |
| 2012/0160499 A1* | 6/2012 | Tirio | | C09K 8/685 |
| | | | | 166/308.1 |
| 2012/0181046 A1* | 7/2012 | Kajaria | | E21B 43/16 |
| | | | | 166/380 |
| 2013/0233560 A1* | 9/2013 | Davidson | | E21B 43/26 |
| | | | | 166/308.1 |
| 2014/0352968 A1* | 12/2014 | Pitcher | | E21B 43/26 |
| | | | | 166/308.1 |
| 2015/0007995 A1* | 1/2015 | Livescu | | E21B 21/00 |
| | | | | 166/305.1 |
| 2015/0114652 A1* | 4/2015 | Lestz | | E21B 43/26 |
| | | | | 166/308.1 |
| 2015/0136409 A1* | 5/2015 | Hall | | E21B 17/20 |
| | | | | 166/344 |
| 2015/0345272 A1 | 12/2015 | Kajaria et al. | | |
| 2016/0061016 A1* | 3/2016 | Ciezobka | | E21B 43/26 |
| | | | | 166/308.1 |
| 2016/0102537 A1* | 4/2016 | Lopez | | E21B 43/26 |
| | | | | 700/282 |
| 2016/0329697 A1* | 11/2016 | Brooks | | H01F 7/064 |
| 2017/0234335 A1* | 8/2017 | LeBlanc | | E21B 34/16 |
| | | | | 137/315.03 |
| 2018/0156004 A1* | 6/2018 | Hussain | | E21B 33/0355 |
| 2018/0258742 A1* | 9/2018 | Sveberg | | E21B 43/017 |

* cited by examiner

REMOTE WELL SERVICING SYSTEMS AND METHODS

RELATED APPLICATIONS

This application is related to and claims priority to U.S. Provisional Patent Application No. 62/291,616, which was filed on Feb. 5, 2016. This application is a continuation-in-part of U.S. patent application Ser. No. 14/725,341, which was filed on May 29, 2015. The full disclosure of these related applications are hereby incorporated herein by reference in their entirety.

BACKGROUND

1. Field of the Invention

The present disclosure relates to servicing well equipment. More particularly, the present disclosure relates to systems and methods of remotely providing a service fluid to one or more well components via a remote servicing manifold.

2. Description of Related Art

Certain hydrocarbon production related operations, such as hydraulic fracturing, utilize well equipment that is made up of many parts. One example is a hydraulic fracturing tree, which has many valves. These valves may need to be greased or lubricated from time to time to ensure proper function and maximum operational life, Typically, this process is carried out manually by an operator at the well site. As such, the operator has to travel to the well site and manually make and break the valve fittings in order to grease the valve. This process is time consuming and costly.

SUMMARY

Applicants recognized the problems noted above herein and conceived and developed embodiments of systems and methods, according to the present disclosure, for remotely providing a service fluid to one or more well components via a remote servicing manifold.

In an embodiment, a remote well servicing system includes a remote servicing manifold, which includes a fluid input line couplable to a service fluid source, a fluid output line couplable to a well component, a valve coupled to the fluid input line and the fluid output line, wherein the valve, when actuated, places the fluid input line in fluid communication with the fluid output line and permits delivery of a service fluid from the service fluid source to the well component, and a control line coupled to and controlling actuation of the valve.

In another embodiment, a remote well servicing system includes a control unit and a remote servicing manifold. The control unit further includes a service fluid source and a control system. The remote servicing manifold further includes a fluid input line coupled to the service fluid source, a fluid output line couplable to a well component, and a valve coupled to the fluid input line and the fluid output line, wherein the valve, when actuated, places the fluid input line in fluid communication with the fluid output line and permits delivery of a service fluid from the service fluid source to the well component. The remote servicing manifold also includes a control line coupling the valve and the control system, wherein the control system controls actuation of the valve via the control line.

In another embodiment, a method of remotely servicing a well component includes supplying a service fluid to a remote servicing manifold, actuating a valve on the remote servicing manifold, thereby permitting flow of the service fluid, and delivering the service fluid from the remote servicing manifold to a well component.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include systems and methods for remotely monitoring and/or servicing a well, such as providing a service fluid without operator intervention at the well site. An example application of the present disclosure includes greasing well assemblies during hydrocarbon drilling and development operations, such as during hydraulic fracturing or when the wells are producing and under pressure. Doing so can reduce failures of the well assembly and the operation. The systems and techniques of the present disclosure may be used for a wide variety of wells and well operations, and is particularly advantageous for wells that are not easily accessible by operators, such as remote land wells, dry offshore wells, and unmanned platforms, where regular servicing can increase operational life.

Figure 1:
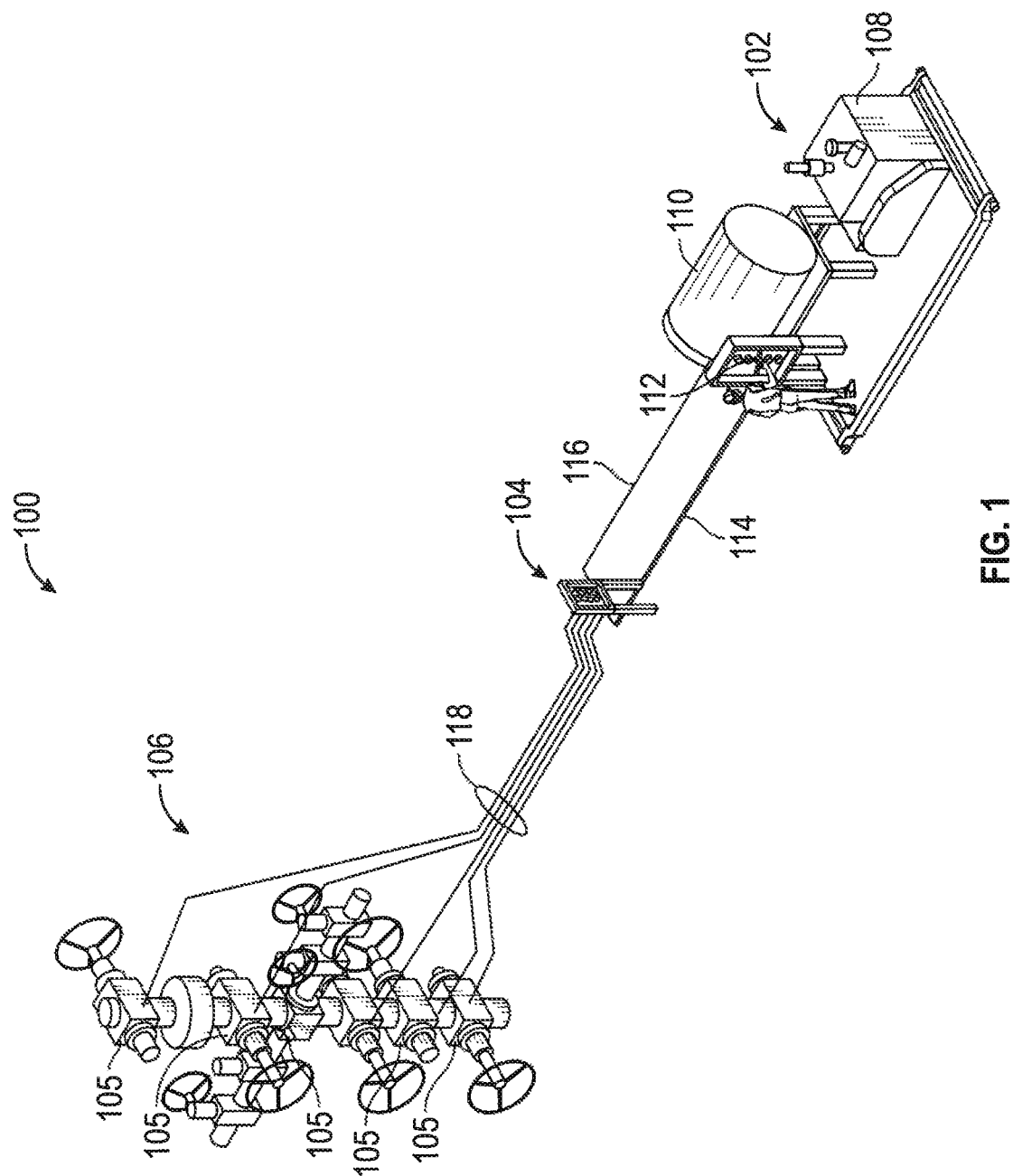
FIG. 1 is a schematic view of a remote well servicing system, in accordance with example embodiments of the present disclosure.

FIG. 1 is a schematic view of a remote well servicing system 100, in accordance with an example embodiment of the present disclosure. The system 100 includes a control unit 102 and a remote servicing manifold 104. Generally, in many applications of the present disclosure, the manifold 104 selectively delivers a service fluid from the control unit 102 to one or more well components 105 of a well 106. The control unit 102 may include a control system 108 and a service fluid source 110, The control system 108 controls at least some aspects of the remote well servicing system 100, The service fluid source 110 may be any suitable type of vessel or reservoir for holding a service fluid. The service fluid may be any type of fluid that may be used to service a well component from time to time. For example, the service fluid source 110 may be a grease or lubricant storage container.

The control system 108 may include one or more processors and/or controllers for carrying out its control functions, including controlling the manifold 104. The control system 108 may also include a control panel 112 or interface through which an operator can interact with the control system 108, such as to input control commands or receive output information. The control panel 112 may be located on the control unit 102, as illustrated in FIG. 1. Alternatively, the control panel 112 can be a part of a remote controller such as a pendant controller or a digital controller. As an example, the control panel 112 can be configured for touch screen operations and allow for straightforward and intuitive operation of the remove servicing operation. The control panel 112 can communicate via wires or wirelessly. Non-exhaustive wireless examples include wireless interne or telemetry, radio, microwave, ultrasonic, or infrared. In some embodiments, the control panel 112 may include a tablet computer, smart phone, personal computer, and the like, that allow for interaction with the control system 112 at one or more offsite locations.

The control unit 102 may be in the form of a wheeled mobile operation center or grease skid. Additional equipment may be located on the control unit that facilitation other operations, such as hydraulic fracturing. The control unit 102 may also include various other system components and control capabilities used to operate and monitor well equipment. Such components may include accumulators, hydraulic, electric, and pneumatic actuators, torque wrenches, pressure pumps, and various meters and visual indicators. Such components may be used to perform certain services at the well 106, such as diagnostic operations, as well as measuring temperature, pressure, oil and gas ratio, water content, and chemical tracers at the well 106.

The remote servicing manifold 104 is located away from the control unit 102, For example, in some applications, the manifold 104 is located twenty-five to one hundred feet from the control unit 102. However, in other example applications, the manifold 104 may be closer to or farther from the control unit 102. The manifold 104 includes a fluid input for receiving a service fluid and a control input for receiving a control signal. In some example embodiments, the fluid input is coupled to the service fluid source 110 at the control unit 102 via a supply line 114 and service fluid is delivered to the manifold 104 from the service fluid source 110 through the supply line 114. There may be a check valve coupled to the supply line 114 to prevent back flow. In some embodiments, the control input is coupled to the control system 108 at the control unit 102 via one or more control lines 116. The control lines 116 may include electrical lines, optical lines, pneumatic lines, and the like, and any combination thereof.

The manifold 104 includes one or more fluid outputs from which the service fluid can be delivered to one or more well components 105 through respective delivery lines 116. There may be one or more check valves coupled to the delivery line 116 to prevent back flow. In certain example applications, the manifold 104 may be located five to fifty feet away from the well 106. However, in some other example applications, the manifold 104 may be located closer to or farther from the well 106. The control system 108 controls delivery of service fluid from the manifold to each of the well components 105 by selectively actuating respective valves within the manifold via the control lines 116. Delivery of service fluid to each of the well components 105 may be independently controlled. Alternatively, service fluid may be delivered to all or a subset of the well components simultaneously.

Figure 2:
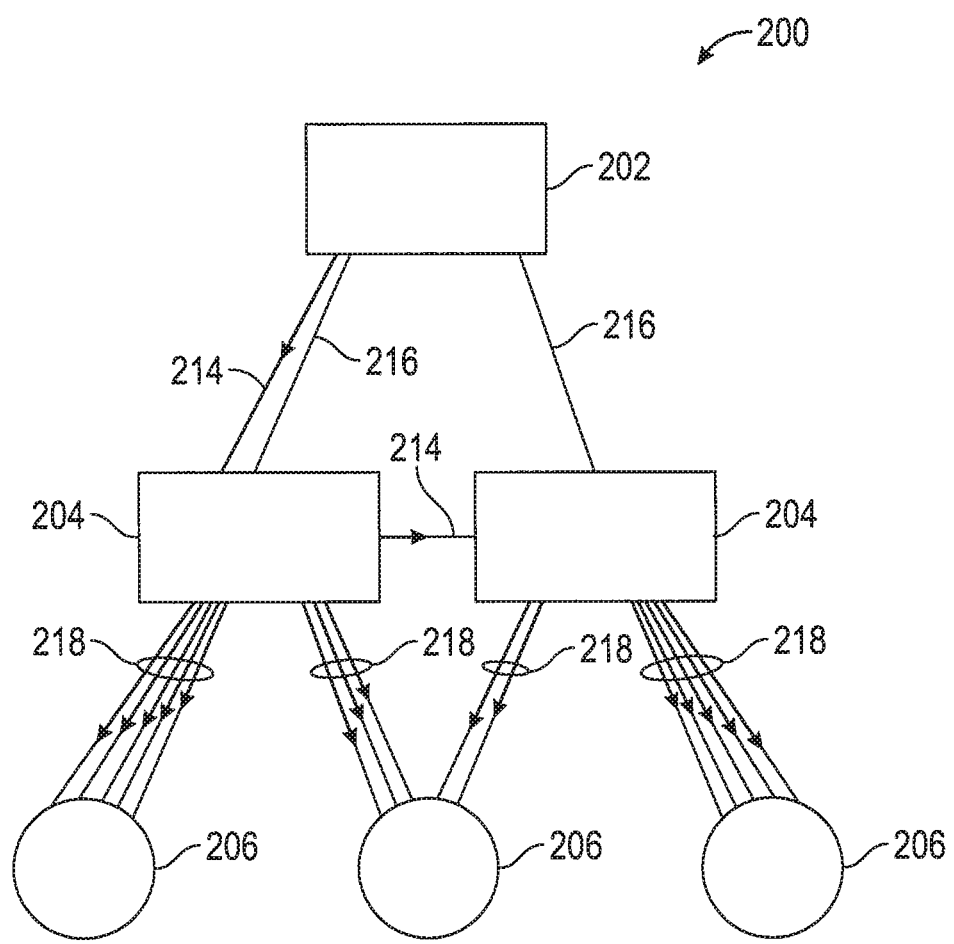
FIG. 2 is a diagram representation of a remote well servicing system, in accordance with example embodiments of the present disclosure.

FIG. 2 is a diagram representation of a remote well servicing system 200, according to example embodiments of the present application. In one or more such embodiments, the system 200 includes a control unit 202 and a plurality of remote servicing manifolds 204. The control unit 202 supplies service fluid to the manifolds 204 via supply lines 214 and controls the manifolds 204 via control lines 216. There may be control lines 216 and supply lines 214 connecting the control unit 202 directly to each manifold 204. Alternatively or additionally, there may be control lines 216 and/or supply lines 214 between manifolds 204. In such embodiments, service fluid and/or control signals may be communicated to one of the manifolds 204 via another manifold 204 rather than directly from the control unit 202, For example, such a configuration may be advantageous in an application where one manifold 204 is physically located between the control unit 202 and another manifold 204. Delivering control signals and/or service fluid to the farther manifold 204 via the closer manifold 204 rather than directly from the control unit 204 may reduce the number or length of lines required.

In the embodiment illustrated in FIG. 2, a manifold 204 can provide service fluid to a plurality of well components on the same well 206 as well as to well components on a plurality of wells 206, as represented by each individual supply line 218. Additionally, one well 206 may receive service fluid from multiple manifolds 204. In some embodiments, the same service fluid may be provided to each of the manifolds 204. In some other embodiments, the control unit 202 may provide different types of services fluids to different manifolds 204. The control unit 202 may also provide different types of service fluids to the same manifold 204. This embodiment may be particularly useful for applications in which different well components require different service fluids.

Figure 3A:
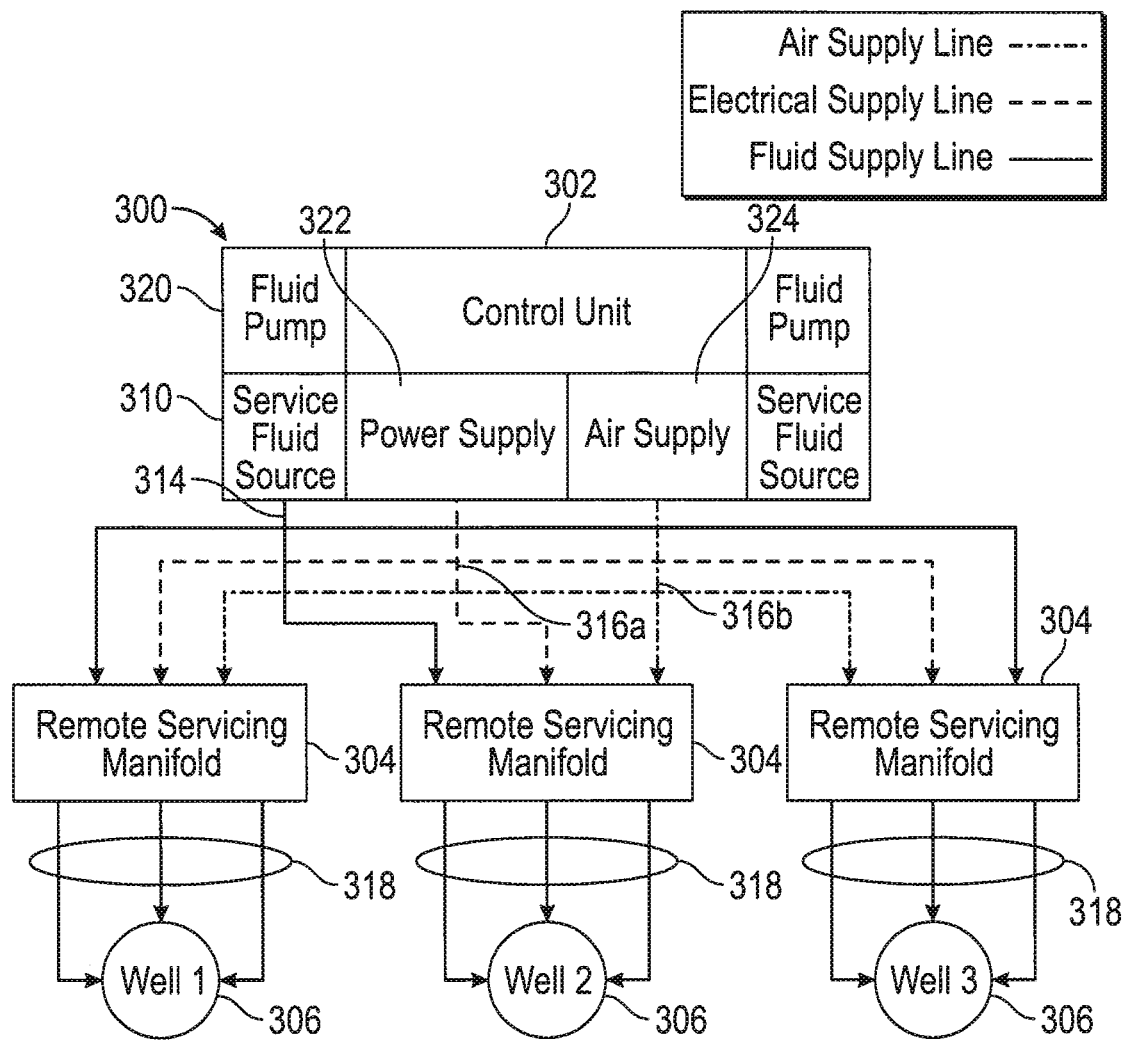
FIG. 3A is a block diagram of a remote well servicing system with remote servicing manifolds having electro-pneumatic valve control, in accordance with example embodiments of the present disclosure.

FIG. 3A is a block diagram of a remote well servicing system 300, illustrating a control unit 302 coupled to three remote servicing manifolds 304 with electro-pneumatic valve control, which are coupled to three wells 306, respectively, in accordance with example embodiments of the present disclosure. The control unit 302 includes at least one service fluid source 310 and may include a pump 320 for pumping the service fluid from the fluid source 310 to the manifolds 304. The service fluid is communicated from the control unit 302 to the manifold 304 via a supply line 314. The control unit 302 further includes an electrical controller 322 and a pneumatic source 324 that together control actuation of individual valves within the manifolds 304 that permit delivery of the service fluid to respective well components at the wells 306. The electrical controller 322 delivers electrical control signals to the manifold 304 via an electrical control line 316a and the pneumatic source delivers an air supply to the manifold 304 via a pneumatic control line 316b. Based on actuation of the valves in the manifolds, service fluid is selectively delivered to respective well components via fluid delivery lines 318. Thus, an operator or program can select to which well components) to provide service fluid. In some example embodiments, for each well component to which the manifold 304 provides service fluid, the manifold 304 includes a valve actuation system 350, as illustrated in FIG. 3B.

Figure 3B:
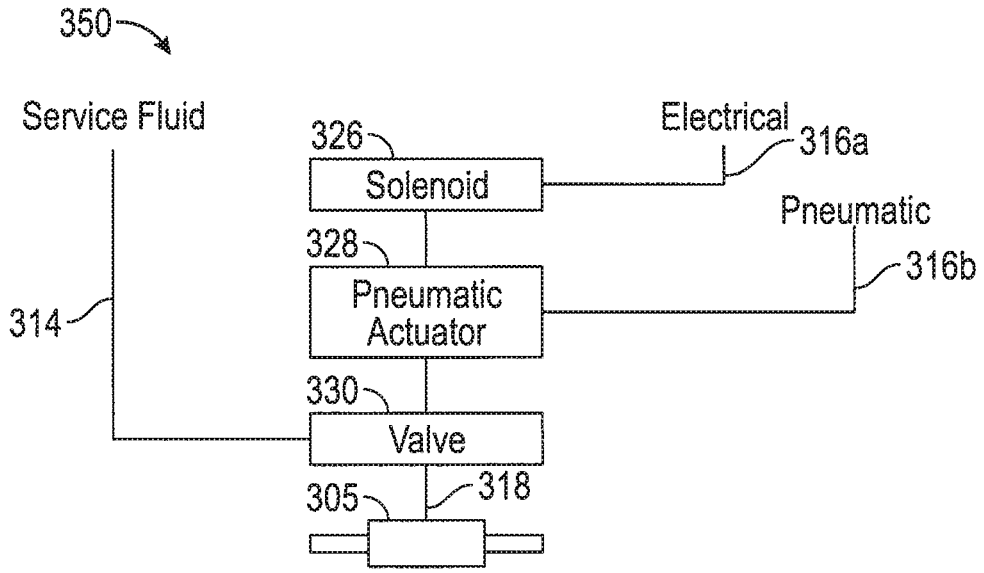
FIG. 3B is a block diagram of a valve actuation system of the manifold of FIG. 3A, in accordance with example embodiments of the present disclosure.

With reference to FIG. 3B, the valve actuation system 350 includes an electrical actuator such as a solenoid 326 which is controlled by an electrical signal from the electrical control line 316a. Upon actuation of the solenoid 326, a pneumatic actuator 328 receives air pressure from the pneumatic control line 316b and opens a valve, such as a needle valve 330. The needle valve is also coupled to the service fluid supply line 314 and the delivery line such that when open, the needle valve permits delivery of the service fluid to the well component 305. Alternatively, the needle valve 330 is coupled to a reservoir of service fluid within the manifold 304 and controls flow of service fluid from the reservoir to the well component 305 via the delivery line 318. In some embodiments, there is a valve actuation system 350 for every well component to which the manifold 304 is configured to deliver service fluid. In some other embodiments, one valve actuation system 350 may be configured to deliver service fluid to multiple well components 305 simultaneously.

Figure 4A:
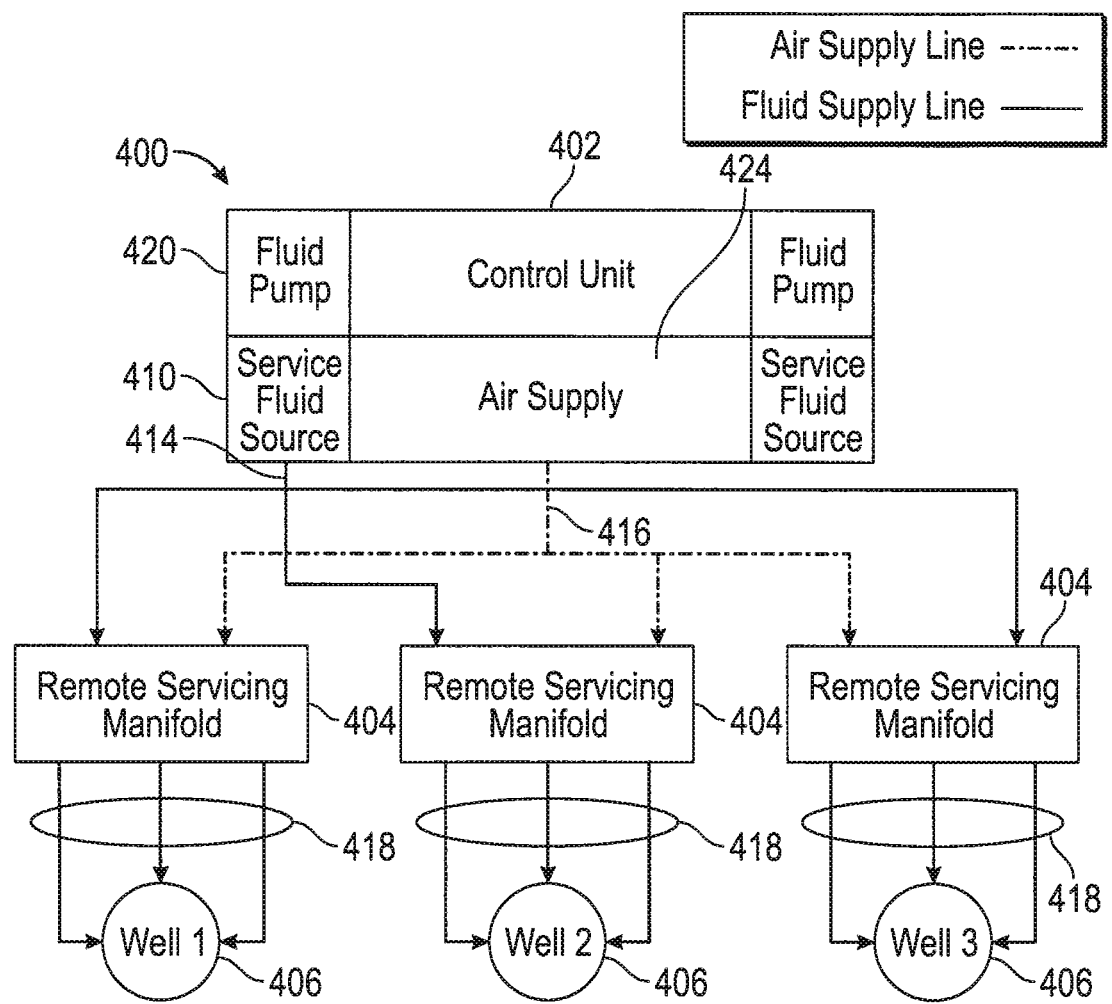
FIG. 4A is a block diagram of a remote well servicing system with remote servicing manifolds having fully pneumatic valve control, in accordance with example embodiments of the present disclosure.
Figure 4B:
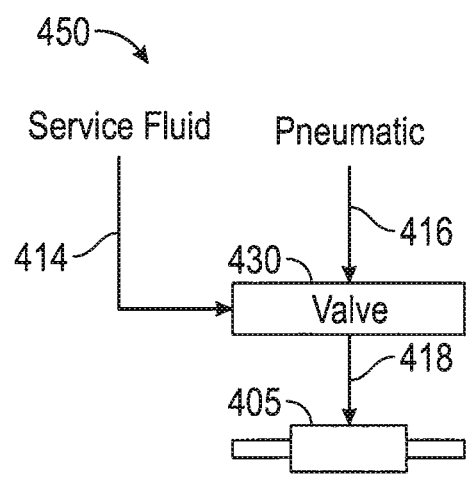
FIG. 4B is a block diagram of a valve actuation system of the manifold of FIG. 4A, in accordance with example embodiments of the present disclosure.

FIG. 4A is a block diagram of a remote well servicing system 400, illustrating a control unit 402, three remote servicing manifolds 404 with fully pneumatic valve control, and three wells 406, in accordance with example embodiments of the present disclosure. The control unit 402 includes at least one service fluid source 410 and may include a pump 420 for pumping the service fluid from the fluid source 410 to the manifolds 404. The service fluid is communicated from the control unit 402 to the manifold 404 via a supply line 414. The control unit 402 further includes a pneumatic controller 424 that controls actuation of valves within the manifolds 404 by sending pneumatic signals through pneumatic control lines 416. Based on actuation of the valves in the manifolds, service fluid is selectively delivered to well components via respective fluid delivery lines 418. Thus, an operator or program can select which well component(s) to provide service fluid to. In some embodiments, the manifold includes a valve actuation system 450 for each well component 405 to which the manifold 404 provides service fluid, as illustrated in FIG. 4B, in accordance in one or more embodiments. In one or more embodiments, the valve actuation system 450 includes a pneumatically valve 430 that is coupled to the delivery line 418 and permits flow of service fluid to the well component through the delivery line 418 upon actuation. The valve 430 can be selectively actuated via the pneumatic control line 416 to permit fluid communication between the supply line 414 and the delivery line 418 to deliver the service fluid to the well component 405. In some embodiments, there is a valve act nation system 450 for every well component 405 to which the manifold 504 is configured to deliver service fluid. In some other embodiments, one valve actuation system 450 may be configured to deliver service fluid to multiple well components 405 simultaneously.

Figure 5:
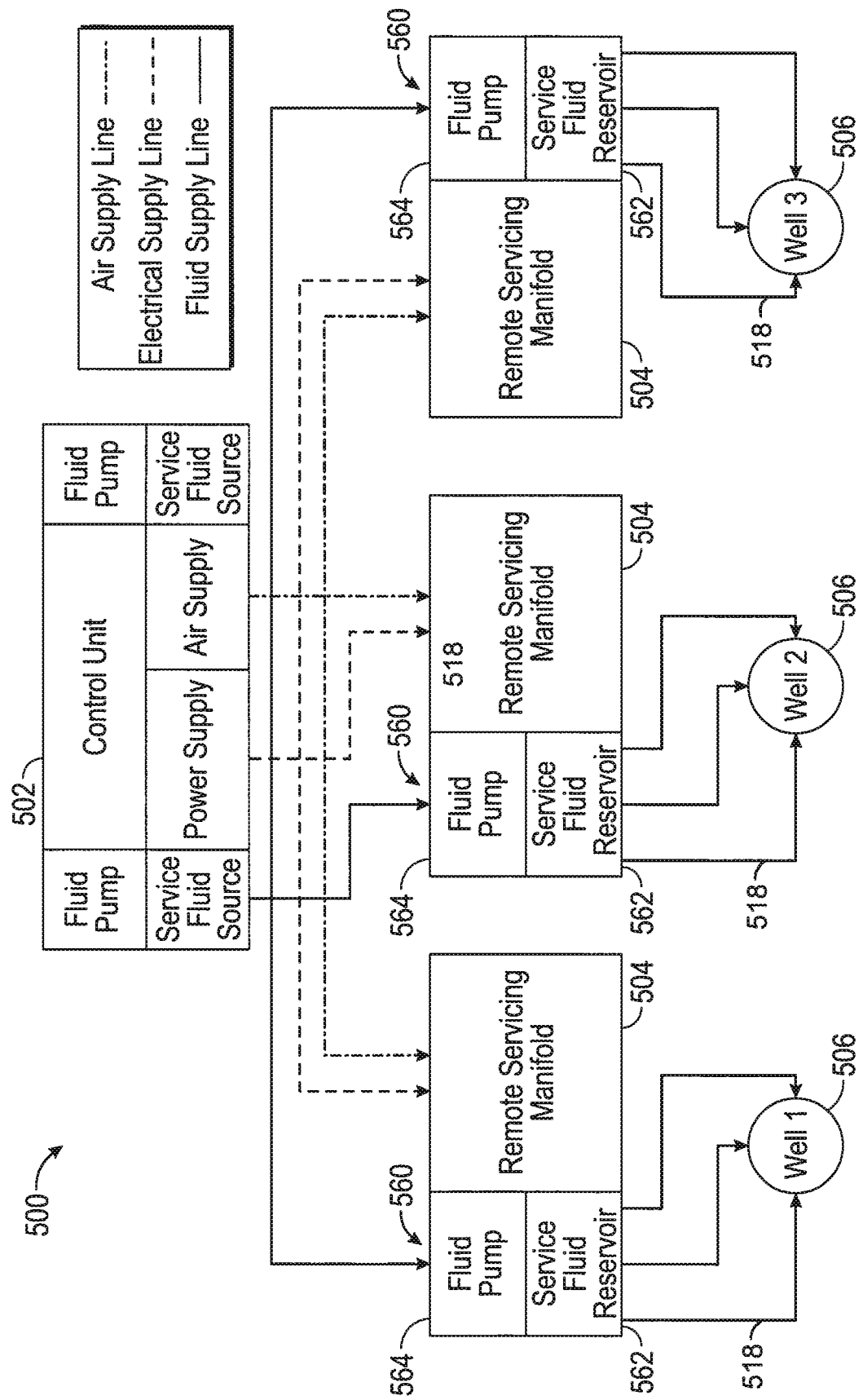
FIG. 5 is a block diagram of the remote well servicing system of FIG. 3A with the addition of a pressure boosting station at the manifolds, in accordance with example embodiments of the present disclosure.
Figure 6:
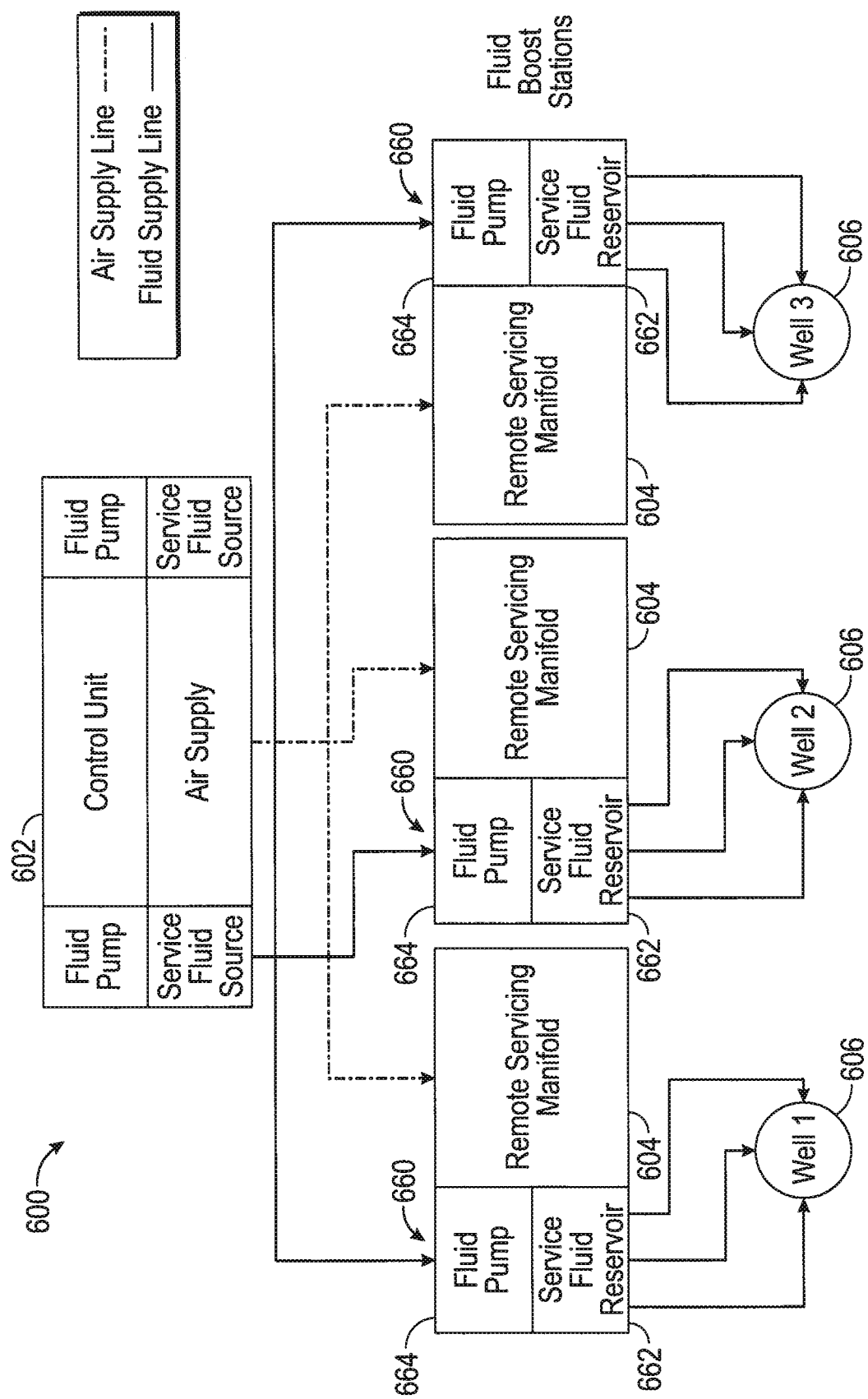
FIG. 6 is a block diagram of the remote well servicing system of FIG. 4A with the addition of a pressure boosting station at the manifolds, in accordance with example embodiments of the present disclosure.

FIG. 5 is a block diagram of a another embodiment of a remote well servicing system 500 similar to the remote well servicing system 300 of FIG. 3, with the addition of a pressure boosting station 560 at the manifold 504. The pressure boosting station 560 increases the pressure of the service fluid in the delivery line 518 to facilitate delivery of the service fluid to the well 506. The pressure boosting station may include a well service fluid reservoir 562 with a pump 564 such that the service fluid can be pumped through the delivery line 518 at a sufficient pressure to ensure delivery of the service fluid to the well. This may be particularly advantageous in application in which there is wellbore pressure acting against delivery of the service fluid or if the well 506 is at a great distance from or a higher altitude than the manifold 504. Similarly, FIG. 6 is a block diagram of a another embodiment of a remote well servicing system 600 similar to the remote well servicing system 400 of FIG. 4, with the addition of a pressure boosting station 660 at the manifold 604.

Figure 7:
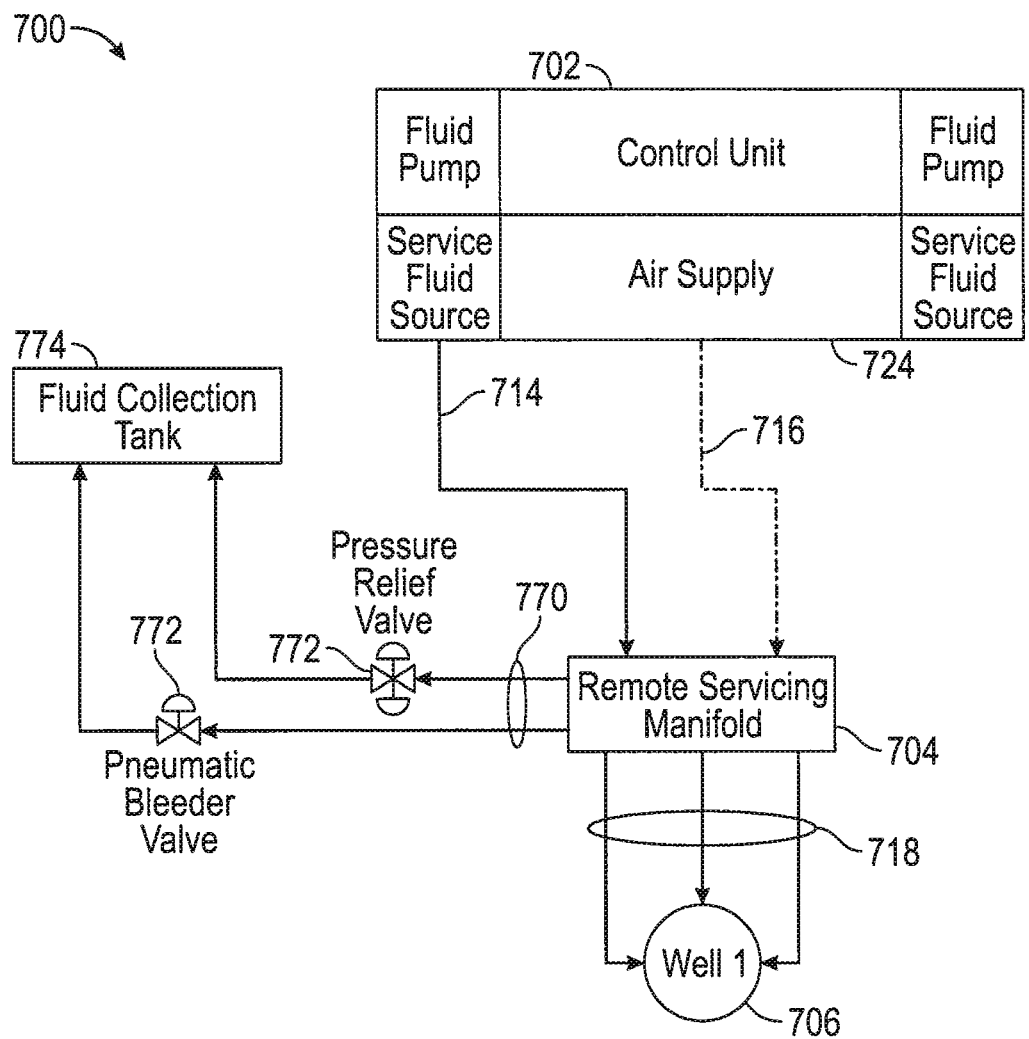
FIG. 7 is a block diagram of a remote well servicing system with pressure relief, in accordance with example embodiments of the present disclosure.

FIG. 7 is a block diagram of a remote well servicing system 700 with pressure relief, in accordance with example embodiments of the present disclosure. The well servicing system 700 includes a control unit 702 which provides service fluid to a remote servicing manifold 704 via a supply line 714 and also controls a pneumatic valve in the manifold via a pneumatic control line 716. The manifold 704 then delivers the service fluid to a well 706 via a delivery line upon actuation of the pneumatic valve. During operation, it may be the case there is a high pressure trapped within the pneumatic control line 716, the supply line 714, or the delivery line 718, such as after closing the valve after a servicing process. As such, bleed lines 770 may be coupled to the pneumatic control line 716, the supply line 714, and/or the delivery line 718. These may be multiple individual bleed lines 770 or one joined bleed line 770. In certain embodiments, the bleed lines 770 are each coupled to a relief valve 772 that can be used to control release of pressure in the respective lines 714, 716, 718. The bleed lines 770 may empty into a collection tank for disposal. In some embodiments, the relief valves 772 may be controlled automatically based on a predetermined protocol such when pressure within a respective line exceeds a certain threshold. Specifically, this may be carried out electronically using a pressure sensor and controller that reads the pressure sensor and controls the relief valve 772 accordingly. This may also be carried out purely mechanically by using a relief valve 772 that s configured to trigger open upon being subject to a certain set-point pressure. Alternatively, the relief valves 772 can be controlled remotely or manually by an operator when needed.

Embodiments of the present disclosure provide a remote well servicing system that allows for servicing of well components, such as applying a servicing fluid, to be carried out without interrupting other well operations or the need to assemble or disassembly any equipment, and without on-site operator intervention.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A remote well servicing system, comprising:
   a fluid input line coupled to a service fluid source;
   a plurality of fluid output lines respectively coupled to a plurality of well components;
   a remote services manifold comprising:
     a fluid input coupled to the fluid input line;
     a plurality of fluid outputs coupled to the plurality of fluid output lines
     a plurality of valves controlling greasing of the plurality of well components, the plurality of valves positioned within the remote servicing manifold and corresponding to the plurality of fluid outputs, wherein each of the plurality of valves, when actuated, places the fluid input line in fluid communication with a corresponding fluid output and permits a service fluid from the service fluid source to a corresponding well component, thereby greasing the corresponding well component; and
     one or more control lines coupled to and controlling actuation of the plurality of valves.

2. The system of claim 1, wherein the one or more control lines comprises a pneumatic control line.

3. The system of claim 1, wherein the one or more control lines comprises a pneumatic control line and an electrical control line, and the one or more control lines controls actuation of the plurality of valves via a solenoid and a pneumatic actuator.

4. The system of claim 1, where the remote servicing manifold further comprises a pressure booster that increases the pressure in the plurality of fluid output lines.

5. The system of claim 1, wherein the remote servicing manifold is coupled to a bleed line, wherein service fluid in the remote service manifold, the fluid input line, and/or the plurality of fluid output lines, is selectively directed into the bleed line to relieve pressure.

6. The system of claim 2, wherein the pneumatic control line is selectively coupled to a pneumatic bleed line to relieve pressure.

7. The system of claim 1, wherein the service fluid comprises a grease or a lubricant.

8. The system of claim 1, further comprising a controller that controls the plurality of valves via the one or more control lines, and wherein the controller is remotely or wirelessly located from the remote servicing manifold.

9. The system of claim 1, further comprising a controller that automatically controls the plurality of valves via the one or more control lines based on a predetermined condition.

10. A remote well servicing system, comprising:
    a control unit, comprising:
      a service fluid source; and
      a control system;
    a remote servicing manifold, comprising:
      a fluid input coupled to the service fluid source via a fluid input line;
      a plurality of fluid outputs couplable to a plurality of well components via a plurality of fluid output lines;
      a plurality of valves controlling greasing of the plurality of well components, the plurality of valves positioned within the remote servicing manifold and corresponding to the plurality of fluid outputs, wherein each of the plurality of valves, when actuated, places the fluid input line in fluid communication with a corresponding fluid output and permits delivery of a service fluid from the service fluid source to a corresponding well component, thereby greasing the corresponding well component; and
      one or more control lines coupling the plurality of valves and the control system, wherein the control system controls actuation of the plurality of valves via the one or more control lines.

11. The system of claim 10, further comprising a plurality of the remote service manifolds, each of which comprises a fluid input line coupled to the service fluid source at the control unit.

12. The system of claim 10, wherein the control system comprises a user interface.

13. The system of claim 10, wherein the control system controls actuation of the plurality of valves based on a command received from a user device.

14. A method of remotely servicing a plurality of well components, comprising:
    supplying a service fluid to a remote servicing manifold via a fluid input line coupled to a fluid source;
    remotely actuating a valve of a plurality of valves within the remote servicing manifold via a control line coupled to the valve, thereby permitting flow of the service fluid;
    delivering the service fluid from the remote servicing manifold to a well component via a fluid output line; and
    greasing the well component with the service fluid.

15. The method of claim 14, further comprising delivering the service fluid from the remote servicing manifold to a plurality of well components simultaneously.

16. The method of claim 14, wherein the service fluid is a greasing fluid or a lubricant.

17. The method of claim 14, further comprising actuating the valve electrically, pneumatically, or electro-pneumatically.

18. The method of claim 14, further comprising relieving pressure in the remote servicing manifold by permitting flow of the service fluid into a bleed line.

* * * * *